United States Patent
Matsui (10) Patent No.: US 6,640,182 B2
(45) Date of Patent: Oct. 28, 2003

(54) METHOD AND APPARATUS FOR CORRECTING A CURVE RADIUS

(75) Inventor: Sadanori Matsui, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/146,172

(22) Filed: May 15, 2002

(65) Prior Publication Data

US 2002/0177936 A1 Nov. 28, 2002

(30) Foreign Application Priority Data

May 16, 2001 (JP) ........................ 2001-146818

(51) Int. Cl.[7] .............. G08G 1/00; G08G 1/09; G06F 7/00
(52) U.S. Cl. .............. 701/96; 340/901; 340/905
(58) Field of Search ................ 701/96, 93, 210, 701/25, 41, 301; 340/901, 905

(56) References Cited

U.S. PATENT DOCUMENTS

| | | | | |
|---|---|---|---|---|
| 5,661,650 A | * | 8/1997 | Sekine et al. .......... | 701/82 |
| 5,922,036 A | * | 7/1999 | Yasui et al. .......... | 701/28 |
| 6,161,071 A | * | 12/2000 | Shuman et al. .......... | 701/48 |
| 6,185,492 B1 | * | 2/2001 | Kagawa et al. .......... | 701/41 |
| 6,223,124 B1 | * | 4/2001 | Matsuno et al. .......... | 701/209 |
| 6,393,361 B1 | * | 5/2002 | Yano et al. .......... | 701/301 |
| 6,493,458 B2 | * | 12/2002 | Yasui et al. .......... | 382/104 |

FOREIGN PATENT DOCUMENTS

JP   A-2000-322697   11/2000

* cited by examiner

Primary Examiner—William A. Cuchlinski, Jr.
Assistant Examiner—Olga Hernandez
(74) Attorney, Agent, or Firm—Christie, Parker & Hale, LLP (57) ABSTRACT

The present invention relates to traveling control for a vehicle and, in particular, to a method and apparatus, in an adaptive cruise control (ACC) system for a vehicle, for correcting the curve radius of the lane on which the vehicle is traveling, wherein the curve radius is corrected accurately and speedily based on the information about the movement of a leading vehicle detected with a radar, etc. The apparatus, in the ACC system, for correcting the curve radius comprises a means of computing a virtual curve radius based on the information about the horizontal movement of the leading vehicle, a means of computing the horizontal relative position for the curve radius obtained by the ACC system and the horizontal relative position for the virtual curve radius, and a means for correcting the curve radius based on the value obtained by synthesizing the computed horizontal relative positions.

12 Claims, 6 Drawing Sheets

METHOD AND APPARATUS FOR CORRECTING A CURVE RADIUS

CROSS-REFERENCE TO RELATED APPLICATION

This application claims priority of japanese Patent Application No. 2001-146818, filed on May 16, 2001.

BACKGROUND OF THE INVENTION

1. Field of the Invention

The present invention relate's to traveling control of a vehicle and, in particular, to an adaptive cruise control (ACC) method and apparatus for selecting a target (i.e., a leading vehicle), by using a laser or radar (called "forward monitoring device" hereinafter), to be followed actively by the vehicle and allowing the vehicle to follow the leading vehicle.

2. Description of the Related Art

The ACC system of a vehicle selects a leading vehicle based on the curve radius of the lane on which a vehicle equipped with the ACC system is traveling, obtained through a steering sensor, etc., and the information about a leading vehicle detected with a forward monitoring device, and allows the ACC equipped vehicle to follow the leading vehicle.

Figure 1:
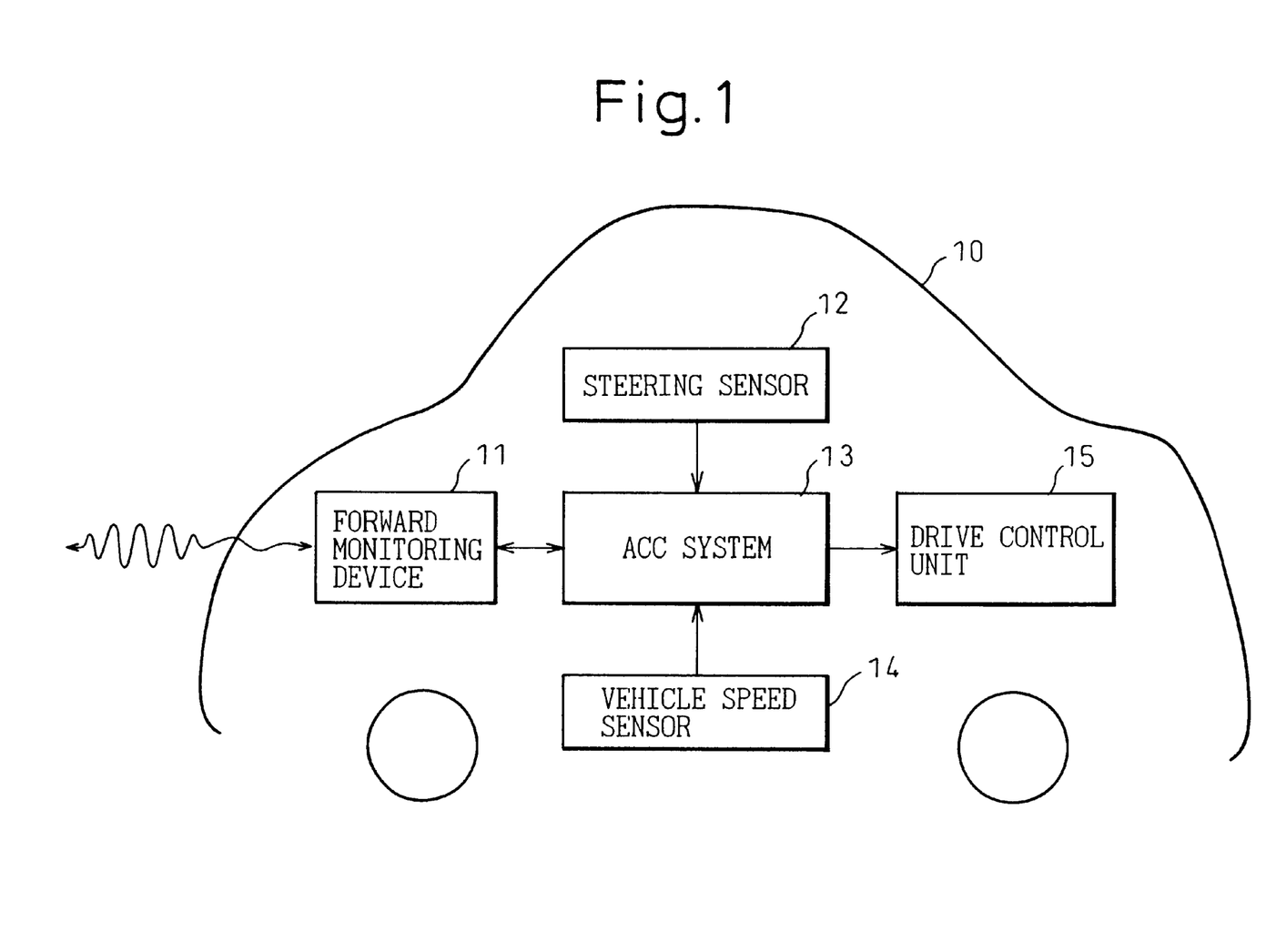
FIG. 1 is a schematic configuration of an ACC system mounted on a vehicle.

FIG. 1 is a schematic configuration of an ACC system mounted on a vehicle 10.

In FIG. 1, the forward monitoring device 11 detects a leading vehicle with a frequency modulated continuous wave (FM-CW) radar, etc. to monitor the distance between the vehicle 10 and the leading vehicle, and the moving direction of the leading vehicle. The steering sensor 12 detects the operation of the steering wheel operated by the vehicle operator, and the vehicle speed sensor 14 detects the traveling speed of the vehicle 10.

The ACC system 13 determines the curve radius, etc. comprehensively based on the information from the forward monitoring device 11, the steering sensor 12, and the vehicle speed sensor 14, and gives a suitable instruction for allowing the vehicle to follow the leading vehicle to the forward monitoring device 11 and the drive control unit 15 for driving the engine, brake, etc. A yaw rate sensor to detect the speed of the vehicle turning a curve may be used instead of the steering sensor 12.

Figure 2:
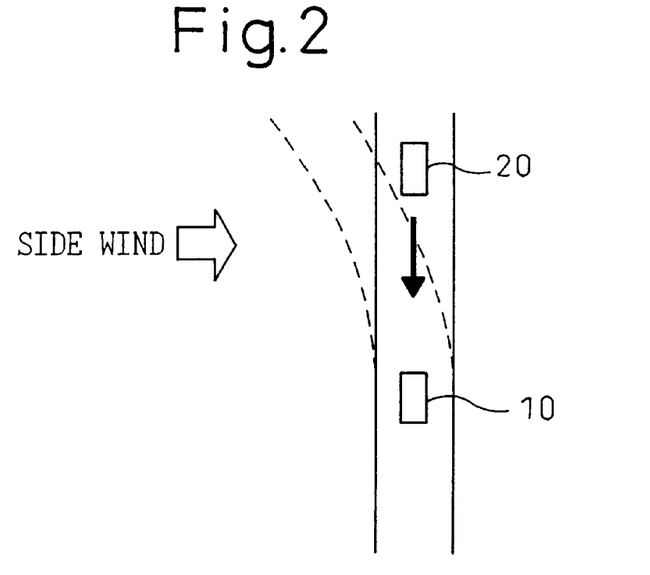
FIG. 2 shows that the curve radius of the lane on which a vehicle equipped with an ACC system is traveling is misjudged due to a side wind.
Figure 3:
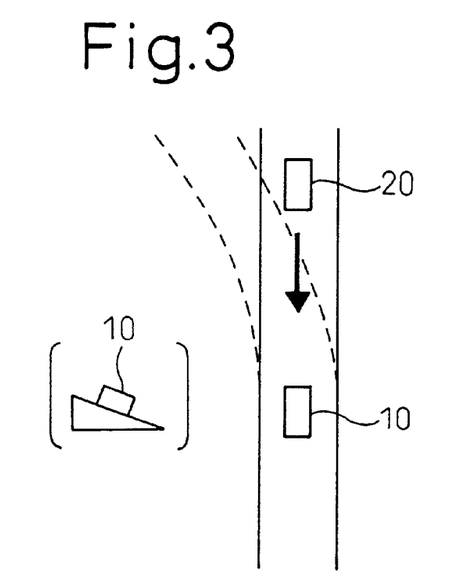
FIG. 3 shows that the curve radius of the lane on which a vehicle equipped with an ACC system is traveling is misjudged due to a slope of the road surface.

By the way, as a conventional ACC system 13 computes the curve radius in such a manner that the information about the operation of the steering wheel is directly reflected by the curve radius, it has the problems as shown in FIG. 2 and FIG. 3 when the ACC equipped vehicle follows a leading vehicle.

FIG. 2 shows that the curve radius of the lane on which an ACC equipped vehicle is traveling is misjudged due to a strong side wind.

In this case, the vehicle 20 is approaching the ACC equipped vehicle 10 traveling forward on a straight lane (shown with solid lines), and a strong side wind is blowing from the left side to the right side of the vehicle 10. In this state, the-operator of the vehicle 10 turns the steering wheel slightly to the left against the side wind to maintain straight-ahead driving.

The turning of the steering wheel to the left is reflected by the curve radius computed on demand by the ACC system 13, and thus the ACC system makes an erroneous judgment that the vehicle 10 is traveling on a lane (shown with dotted lines) curved to the left. As a result, the range to be monitored by the forward monitoring device 11 concentrates on the lane curved to the left due to the instruction from the ACC system 13, and cannot be corrected by the curve radius.

FIG. 3 shows that the curve radius of the lane on which an ACC equipped vehicle is traveling is misjudged due to the slope of the road surface provided for improving the drainage of the road.

In this state, the operator of the vehicle 10 drives the vehicle while turning the steering wheel slightly to the left against the slope of road surface. As a result, the range to be monitored by the forward monitoring device 11 concentrates on the lane curved to the left due to the instruction from the ACC system 13, and cannot be corrected by the curve radius.

SUMMARY OF THE INVENTION

It is therefore an object of the present invention to provide a method and apparatus, in an ACC system for a vehicle, for correcting the curve radius of the lane on which the vehicle is traveling, which improves the accuracy of the selection of a leading vehicle by correcting an actual curve radius on demand by comparing the inputted actual curve radius with the curve radius assumed by monitoring the movement of the leading vehicle detected by the forward monitoring device.

In one aspect, the present invention provides a method for correcting the curve radius of the lane on which the vehicle is traveling, comprising: detecting the curve radius by a curve detection sensor; determining whether a curve radius is wrong based on the first detected position and the present position of a leading vehicle; computing a virtual curve radius based on the detected information about the leading vehicle; and synthesizing the horizontal relative position for the curve radius and the horizontal relative position for the virtual curve radius.

In another aspect, the present invention provides an apparatus for correcting the curve radius of the lane on which the vehicle is traveling, comprising: a means of detecting the curve radius by a curve detection sensor; a means of determining whether a curve radius is wrong based on the first detected position and the present position of a leading vehicle; a means of computing a virtual curve radius based on the detected information about the leading vehicle; and a means of synthesizing the horizontal relative position for the curve radius and the horizontal relative position for the virtual curve radius.

In the present invention, the curve radius obtained by the ACC system of a vehicle is corrected only when the straight lane on which the vehicle is traveling is considered to be a curve lane by mistake. The movement in the horizontal direction of an approaching vehicle in front of the vehicle is monitored, and when the approaching vehicle has moved out of the expected range, the curve radius is corrected. The correction is performed by assigning weights to the horizontal relative position computed based on the curve radius obtained by the ACC-EUC, and to the horizontal relative position computed based on the virtual curve radius obtained from the position of the approaching vehicle detected by the radar.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 4:
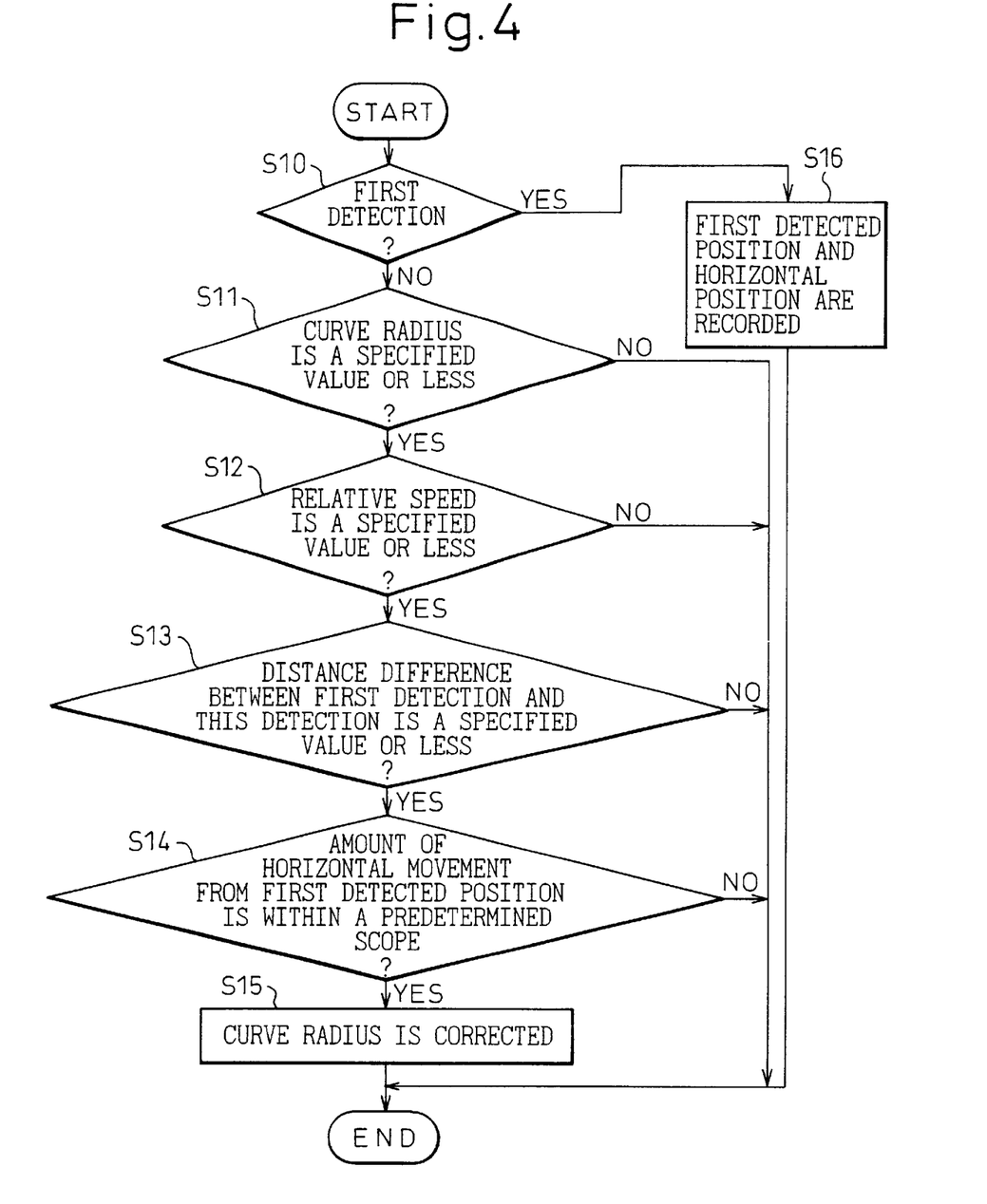
FIG. 4 shows a process flow of correcting the curve radius according to the present invention.

FIG. 4 shows a process flow of correcting the curve radius of the lane on which a vehicle equipped with an ACC system is traveling, according to the present invention.

This process flow is mainly premised on the state (a straight lane is considered to be a curved lane) shown in FIG. 2. In this flow, the present curve radius is corrected on demand by using the monitoring data of an approaching leading vehicle, and thereby the risk of accidents, etc. caused by the misjudgment on the curve radius is decreased. Further, the correction of the curve radius is minimized in consideration of the safety of traveling vehicles, and is performed only when all of the following conditions (S11 to S14) are met.

In FIG. 4, when a leading vehicle is detected at first, the detected initial position of the leading vehicle, and the horizontal position of the leading vehicle horizontally deviated from the longitudinal center line of the ACC equipped vehicle are recorded (S10 and S16). Next, the following processes are performed continuously while monitoring the movement of the detected leading vehicle.

At the step S11, it is determined whether the curve radius computed by the ACC system is a specified value or less for which the correction of the curve radius is required. If the curve radius is less than the specified value in such a case of a sharp curve of the lane, the curve radius is corrected. At the step S12, it is determined whether the relative speed between the ACC equipped vehicle and the leading vehicle is a specified value or less, and only when the leading vehicle approaches the ACC equipped vehicle at a high speed, the curve radius is corrected.

At the step S13, it is determined whether the difference between the distance from the ACC equipped vehicle to the leading vehicle at the first detection and the distance from the ACC equipped vehicle to the leading vehicle at this detection is a specified value or less, and only when the difference is less than the specified value, is the curve radius corrected. At the step S14, it is determined whether the amount of the horizontal movement from the first detected position of the leading vehicle is within a predetermined scope. If the leading vehicle is out of the area having a predetermined length in the direction of the travel of the ACC equipped vehicle, the curve radius is considered to be correct, and is not corrected because there is a little possibility of a collision between the ACC equipped vehicle and the leading vehicle. When all of the above conditions are met, the curve radius is corrected (S15).

Figure 5:
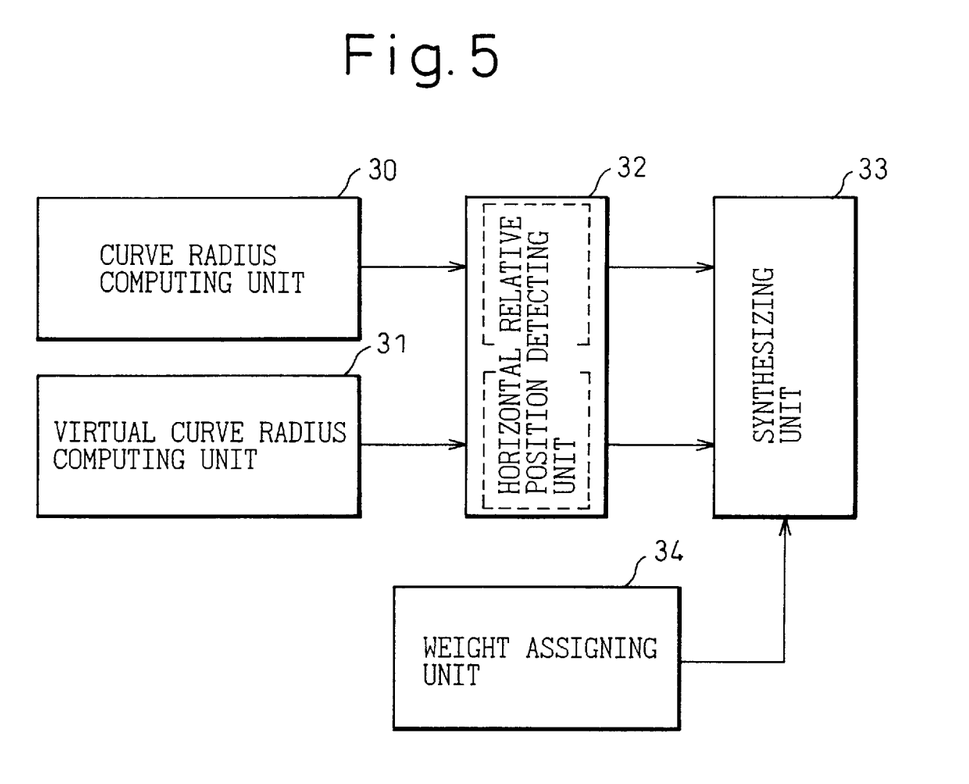
FIG. 5 is a functional block diagram of an ACC system performing the correcting process of the present invention.

FIG. 5 is a functional block diagram of the ACC system performing the correcting process at the step S15.

In FIG. 5, the curve radius computing unit 30 computes a curve radius of the lane on which the ACC equipped vehicle is traveling, the virtual curve radius computing unit 31 computes a virtual curve radius described later, and the horizontal relative position detecting unit 32 computes the horizontal relative position for the curve radius and the horizontal relative position for the virtual curve radius. The curve radius computing unit 30 may be provided in the forward monitoring device 11 (see FIG. 1) instead of in the ACC system 13. The weight assigning unit 34 assigns the weight, corresponding to the distance between the vehicle 10 and the leading vehicle 20, to the horizontal relative position for the curve radius and the horizontal relative position for the virtual curve radius. The detailed operations and processes of these units are described in connection with the following embodiments FIG. 6 and FIG. 7 depict an embodiment wherein a leading vehicle 20 approaching the vehicle 10 is detected through the processes shown in FIG. 4 and FIG. 5, and then the curve radius correcting process is started.

Figure 6:
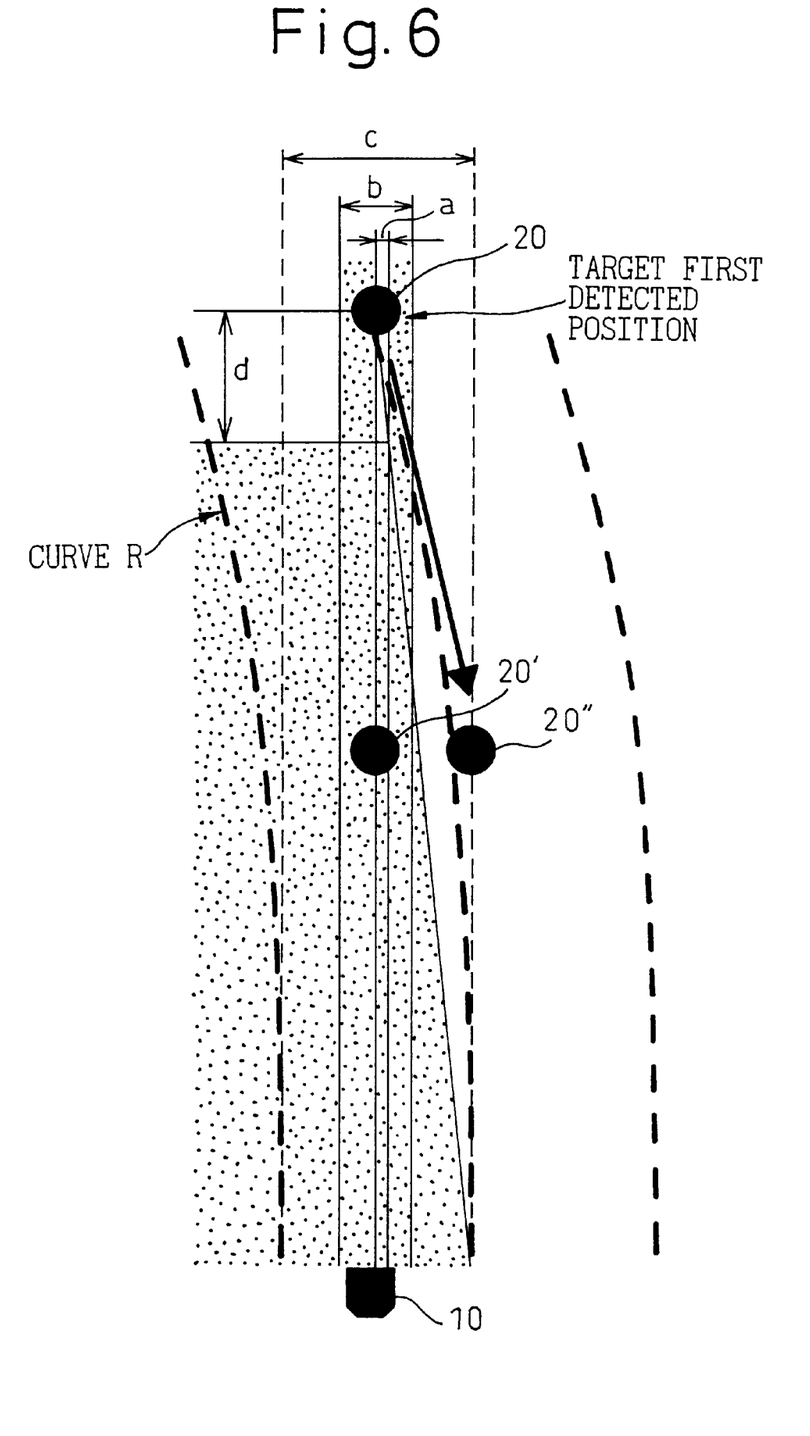
FIG. 6 shows an embodiment (1) of the correction of the curve radius according to the present invention.
Figure 7:
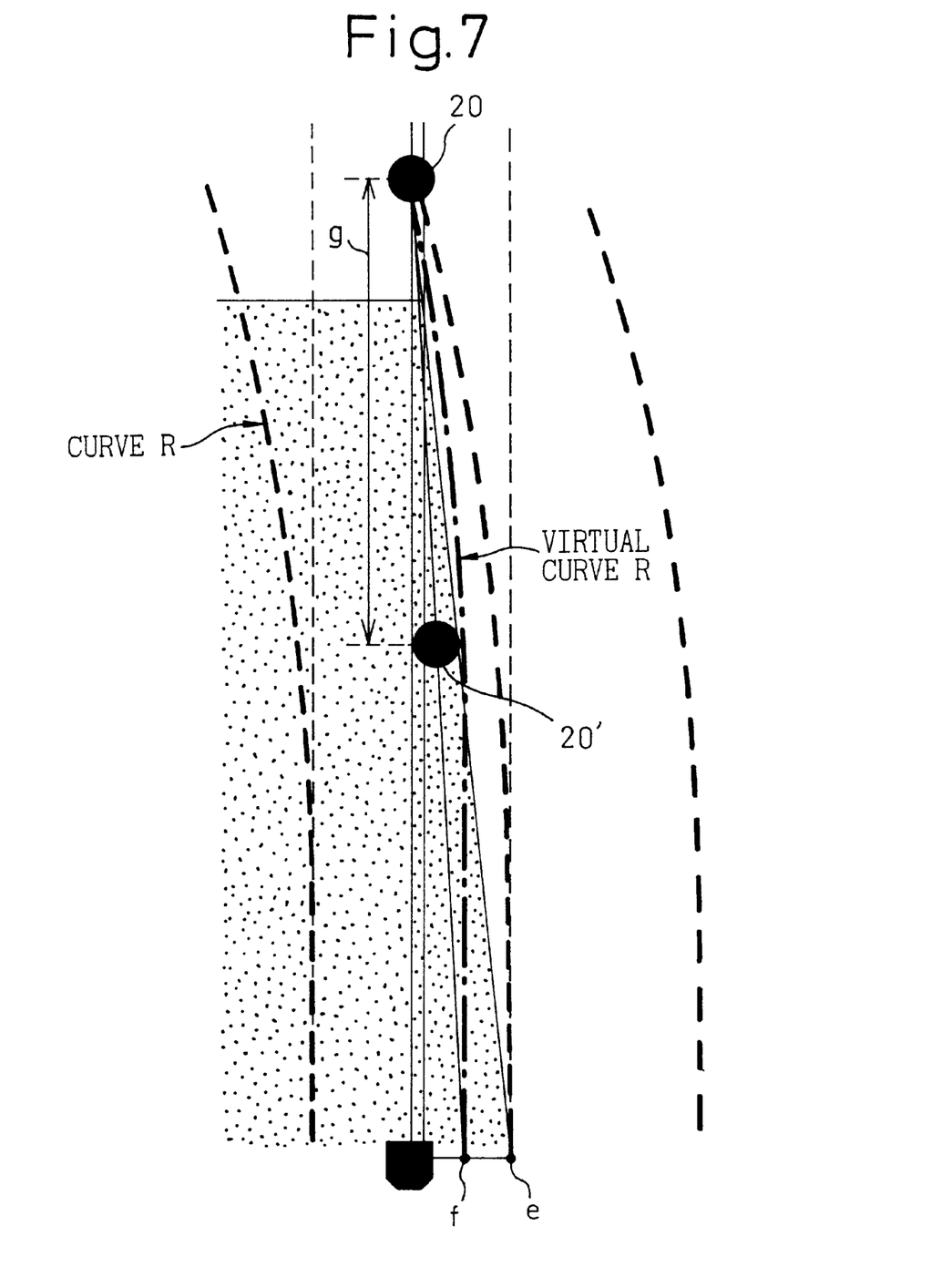
FIG. 7 shows an embodiment (2) of the correction of the curve radius according to the present invention.

In FIG. 6, the vehicle 10, at first, detects a leading vehicle 20 approaching the vehicle 10 with an FM-CW radar, etc., and stores the distance between the vehicle 10 and the leading vehicle 20, the angle between the travel direction of the vehicle 10 and the travel direction of the leading vehicle 20, etc. (S10 and S16).

In this embodiment, the area (a) having a horizontal length a (e.g., a=0.2 m) from the first detected position of the leading vehicle 20, and the area (d) having a predetermined distance d (e.g., d=10% of the first detected distance) in the direction of the approach from the first detected position of the leading vehicle 20 are taken as dead zones. When the leading vehicle is in the dead zones, the computation for correcting the curve radius is not performed, because there may be uncertainty as to the distance measurement in the horizontal direction (S13).

In the above conditions, the correction of the horizontal position is performed only for the leading vehicle detected at first in the horizontal position comparison area (b) having the width b (e.g., |b/2|=0.8 m) in front of the vehicle 10 shown in FIG. 6, and the area (c) having the width c (e.g., c=3.6 m) is an assumed lane. Further, the computed curve radius shown by the dotted thick lines is corrected only when it is less than, for example, 4000 m for a sharp curve (S11).

The first detected leading vehicle 20 is then monitored. When the leading vehicle 20 has moved to the position 20" along the curve R, the present curve radius is considered to be correct and is not corrected. On the contrary, when the leading vehicle 20 has moved to the. position 20' in the shaded area (the left area of the line connecting the first detected position of the leading vehicle 20 and the position where the right end line of the lane intersects the line passing through the vehicle 10 and perpendicular to the right end line) being off the curve R, the present curve radius is corrected (S15).

FIG. 7 shows an example of a curve radius corrected under the condition of FIG. 6.

The curve radius is corrected by assigning the weight, corresponding to the distance g between the first detected position and the present position of the leading vehicle, to the horizontal relative position for the curve radius obtained by the ACC system and the horizontal relative position for the virtual curve radius obtained through the movement of the leading vehicle 20' in the shaded area.

The virtual curve radius is obtained as a curve radius of the curve, connecting the position 20 of the. leading vehicle and the right end point f of the vehicle 10 where the straight line connecting the first detected position 20 of the leading vehicle and the position 20' where the leading vehicle has moved intersects the line passing through the vehicle 10 and perpendicular to the right end line, obtained from the triangle connecting the first detected position 20 of the leading vehicle, the vehicle 10, and the right end point f. The curve radius may be obtained by other methods by which substantially the same result is obtained.

The virtual curve radius in this embodiment can be obtained by the following equation.

$$\text{Virtual Curve Radius} = \frac{\text{First Detected Distance} \times (\text{First Detected Distance} - \text{This Time Detected Distance})}{2 \times (\text{First Detected Horizontal Position} - \text{This Time Detected Horizontal Position})}$$

In the present invention, the horizontal relative position after the correction is obtained in principle by synthesizing the horizontal relative position for the curve radius obtained by the ACC system and the horizontal relative position for the virtual curve radius. Further, in the present invention, a weight corresponding to the distance g between the first detected position and the present position of the leading vehicle is assigned to each of the horizontal relative positions before the synthesizing.

For example, when the leading vehicle 20 is in the first detected position, a weight of 100% is assigned to the horizontal relative position for the present curve radius, and when the leading vehicle 20 approaches the vehicle 10 and is in the distance of, for example, 30 m from the vehicle 10, a weight of 100% is assigned to the horizontal relative position for the virtual curve radius. Such an interpolation makes it possible to speedily perform the correction that matches the actual state of the vehicle traveling.

As described above, according to the present invention, the curve radius of the lane on which a vehicle is traveling is corrected, on demand, based on the information about the movement of a leading vehicle, and thereby the accuracy and reliability of the selection of a leading vehicle are improved remarkably. As a consequence, even if a wrong curve radius is computed, due to a side wind, etc., based on the information obtained through a steering sensor, etc., a leading vehicle can be detected correctly.

What is claimed is:

1. A method for correcting the curve radius of the lane on which the vehicle is traveling, the method comprising: detecting the curve radius by a curve detection sensor; determining whether the curve radius is wrong based on the first detected position and the present position of a leading vehicle; computing a virtual curve radius based on the detected information about the leading vehicle; and synthesizing the horizontal relative position for the curve radius and the horizontal relative position for the virtual curve radius.

2. The method of claim 1 further comprising assigning a weight corresponding to the distance between said vehicle and said leading vehicle to the detected horizontal relative positions.

3. The method of claim 1, wherein said curve radius is not corrected when said curve radius is a predetermined value or more.

4. The method of claim 1, wherein said curve radius is not corrected when the relative speed between said vehicle and said leading vehicle is a predetermined value or less.

5. The method of claim 1, wherein said curve radius is not corrected when said leading vehicle has not moved for a predetermined distance in the direction of said vehicle from the detected position of said leading vehicle.

6. The method of claim 1, wherein said curve radius is not corrected when said leading vehicle has moved out of the area having a predetermined length in the horizontal direction from the detected position of said leading vehicle.

7. An apparatus for correcting the curve radius of the lane on which the vehicle is traveling, comprising: a means of detecting the curve radius by a curve detection sensor; a means of determining whether the curve radius is wrong based on the first detected position and the present position of a leading vehicle; a means of computing a virtual curve radius based on the detected information about the leading vehicle; and a means of synthesizing the horizontal relative position for the curve radius and the horizontal relative position for the virtual curve radius.

8. The method of claim 2, wherein said curve radius is not corrected when the relative speed between said vehicle and said leading vehicle is a predetermined value or less.

9. The method of claim 2, wherein said curve radius is not corrected when said leading vehicle has not moved for a predetermined distance in the direction of said vehicle from the detected position of said leading vehicle.

10. The method of claim 2, wherein said curve radius is not corrected when said leading vehicle has moved out of the area having a,predetermined length in the horizontal direction from the detected position of said leading vehicle.

11. An apparatus, in an adaptive cruise control (ACC) system for the vehicle, for correcting the curve radius of the lane on which the vehicle is traveling, the apparatus comprising: a means of determining whether the curve radius is wrong based on the first detected position and the present position of a leading vehicle; a means of computing a virtual curve radius based on the detected information about the leading vehicle; and a means of synthesizing the horizontal relative position for the curve radius obtained by the ACC system and the horizontal relative position for the virtual curve radius obtained based on the position of the leading vehicle.

12. The apparatus of claim 11 further comprising a means of assigning a weight corresponding to the distance between said vehicle and said leading vehicle to the detected horizontal relative positions.

* * * * *

UNITED STATES PATENT AND TRADEMARK OFFICE
CERTIFICATE OF CORRECTION

PATENT NO. : 6,640,182 B2 Page 1 of 1
DATED : October 28, 2003
INVENTOR(S) : Sadanori Matsui It is certified that error appears in the above-identified patent and that said Letters Patent is hereby corrected as shown below:

Column 6,
Line 47, replace "a,predetermined" with -- a predetermined --

Signed and Sealed this

Nineteenth Day of October, 2004

JON W. DUDAS
*Director of the United States Patent and Trademark Office*